July 8, 1947. J. E. CLARKE 2,423,552
MAGNETIC TESTING APPARATUS
Original Filed Sept. 10, 1941 6 Sheets-Sheet 1
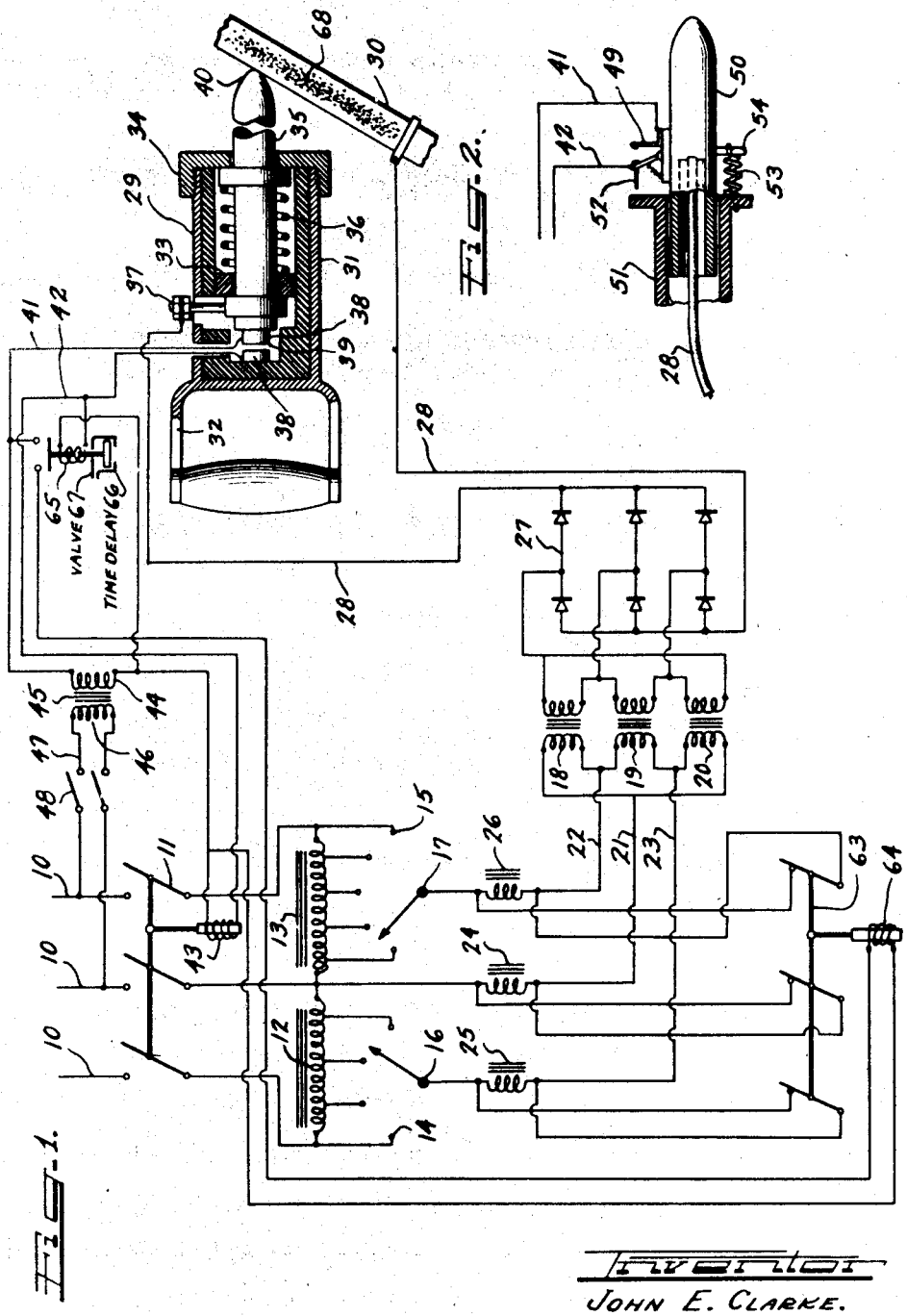
Inventor
John E. Clarke.
by Charles W. Hills Atty.

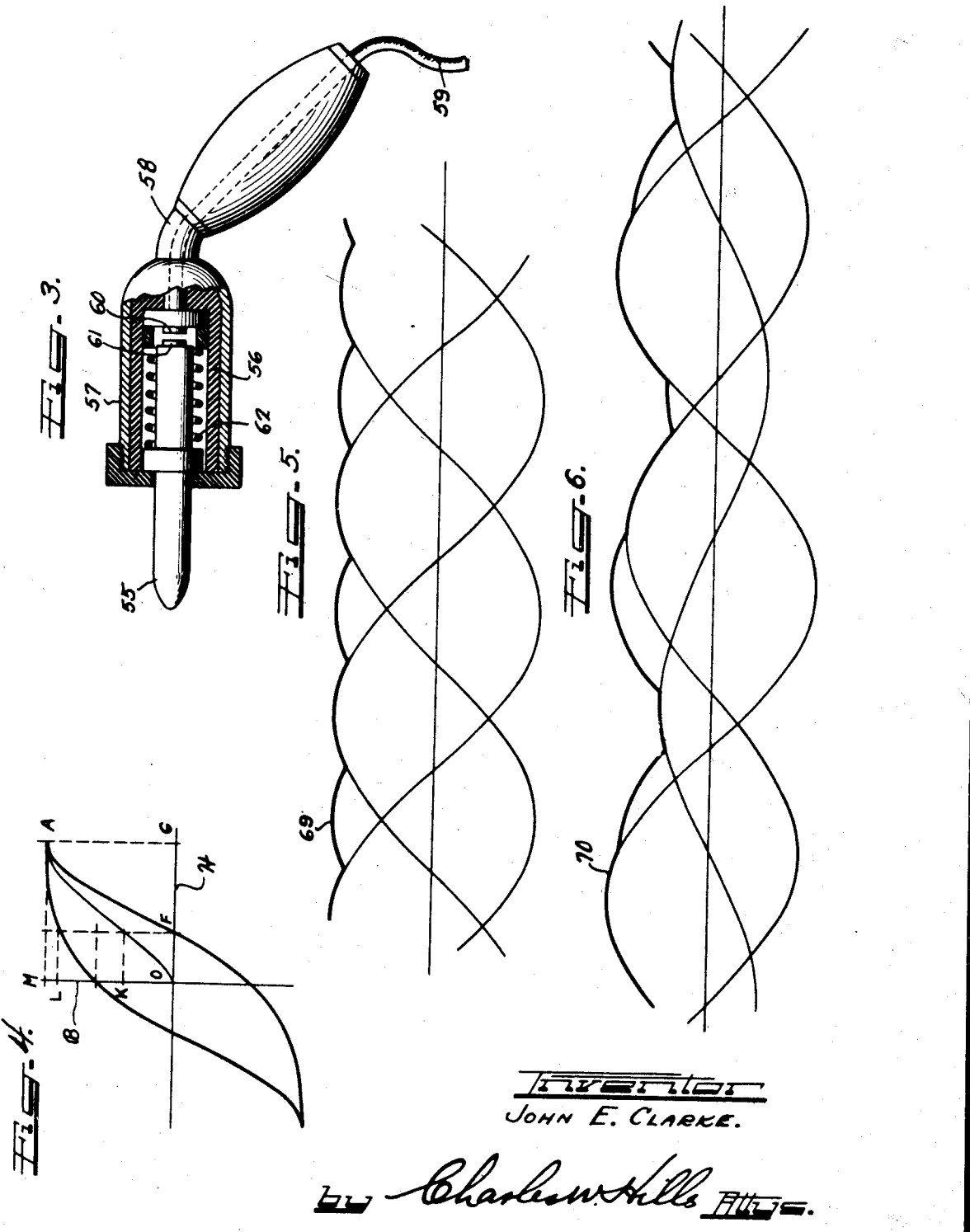

July 8, 1947.  J. E. CLARKE  2,423,552
MAGNETIC TESTING APPARATUS
Original Filed Sept. 10, 1941  6 Sheets-Sheet 3

Inventor
JOHN E. CLARKE.
by Charles W. Hills
Atty.

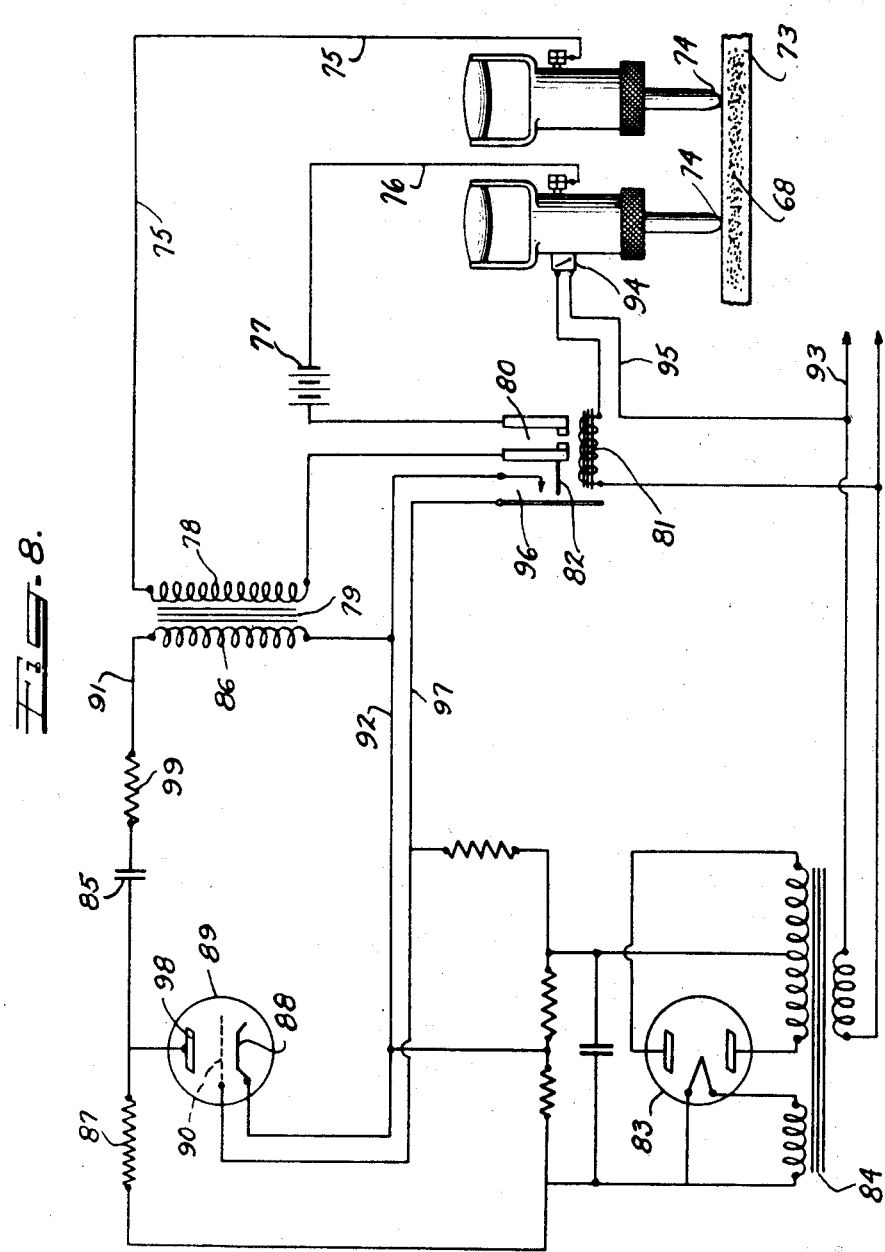

July 8, 1947.    J. E. CLARKE    2,423,552
MAGNETIC TESTING APPARATUS
Original Filed Sept. 10, 1941    6 Sheets-Sheet 5
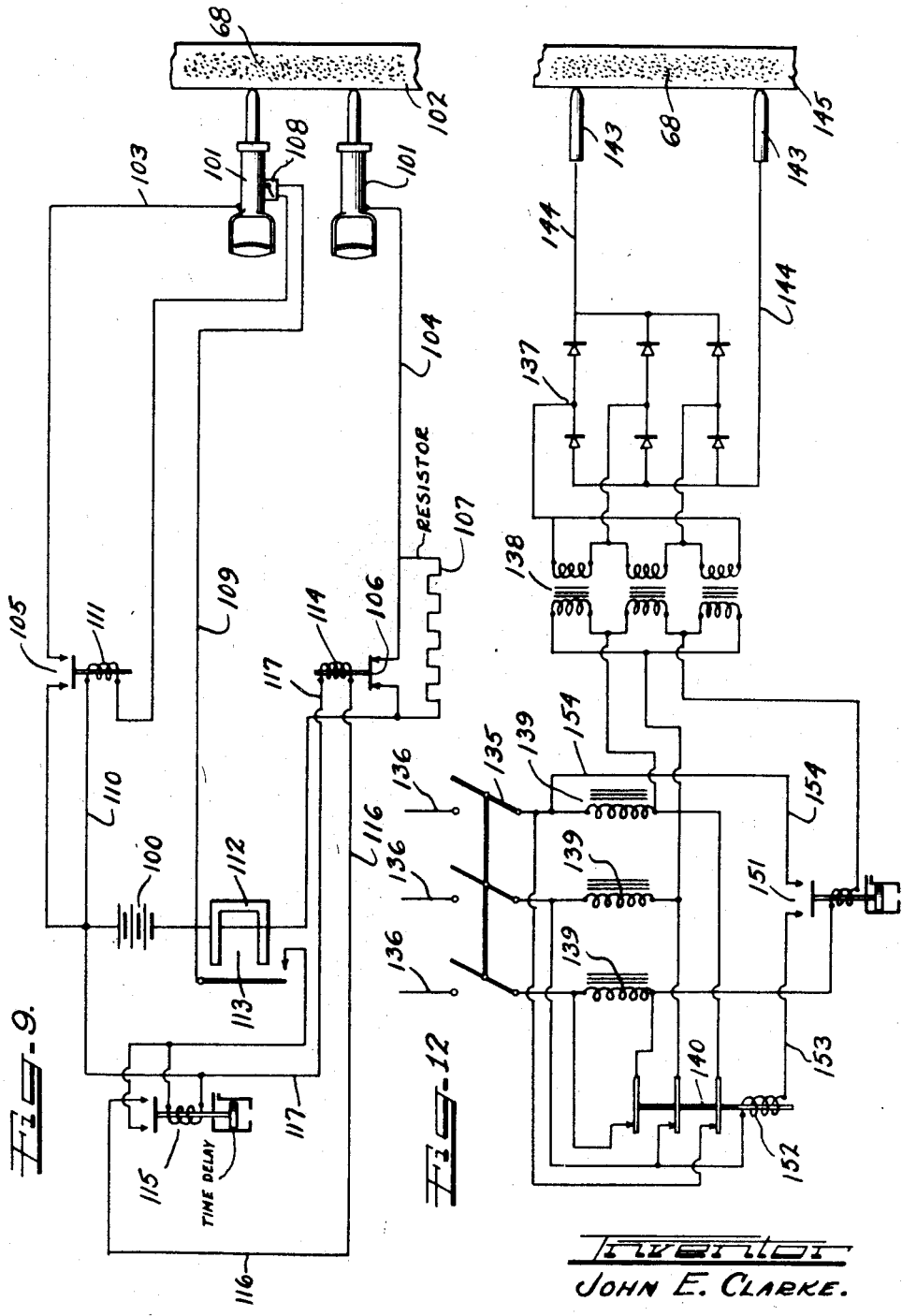

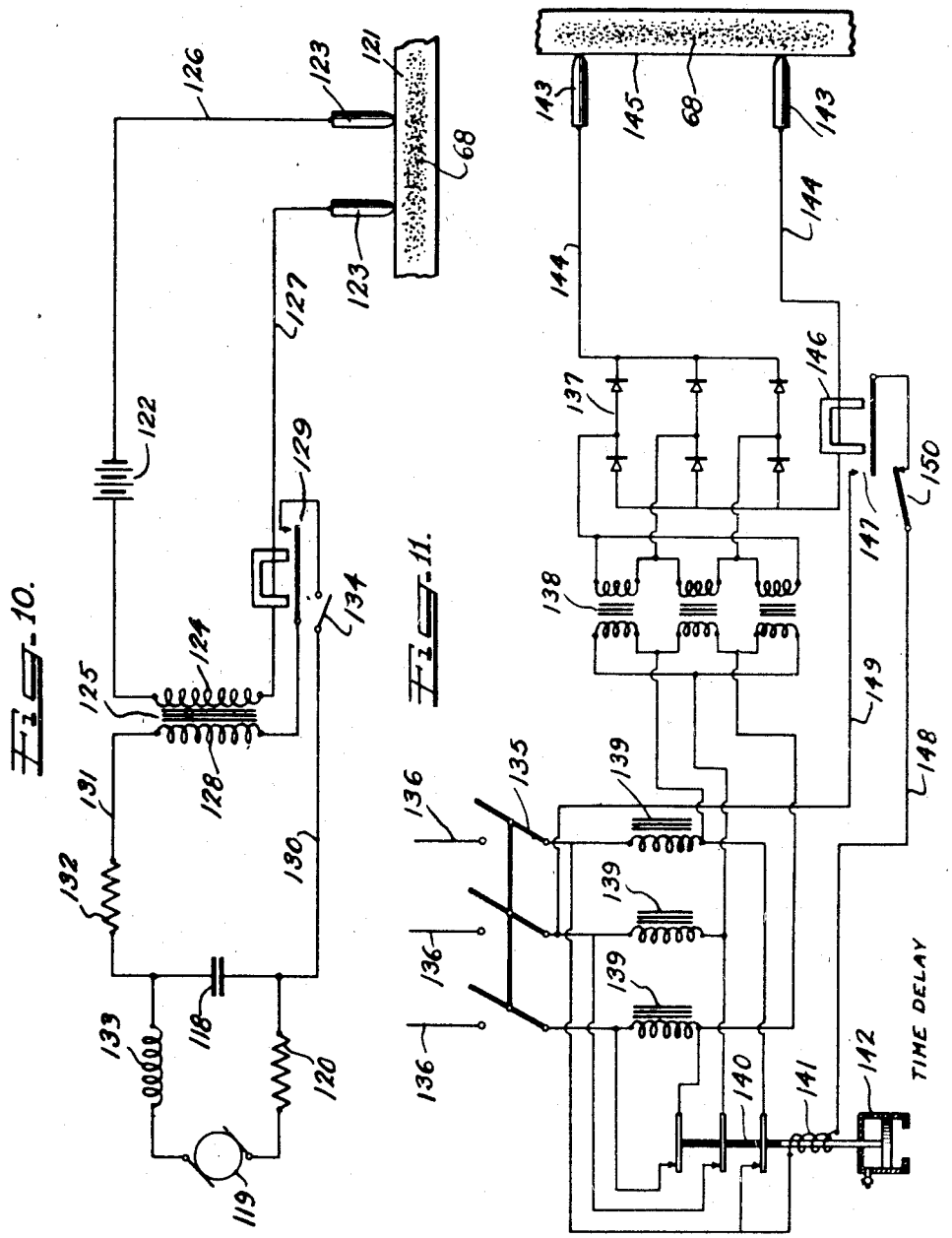

Patented July 8, 1947

2,423,552

UNITED STATES PATENT OFFICE 2,423,552

MAGNETIC TESTING APPARATUS

John E. Clarke, Chicago, Ill., assignor to Magnaflux Corporation, Chicago, Ill., a corporation of Delaware Original application September 10, 1941, Serial No. 410,334. Divided and this application May 28, 1942, Serial No. 444,780

7 Claims. (Cl. 175—183)

This invention relates to magnetic testing apparatus and more particularly to a magnetizing prod and energizing system therefor, including novel switch means and switching system.

In general, the apparatus to which this invention relates is employed in magnetically inspecting paramagnetic objects for fissures, cracks, and other structural defects. It is particularly applicable in the testing of welds for voids, shrinkage cracks and lack of fusion, and in testing of large areas such as edges of thick plates for the type of defect frequently spoken of as laminations or inclusions of non-magnetic material which have been rolled out in such a manner as to present themselves as definite magnetic discontinuities at the exposed surface.

This invention is a division of my co-pending application for "Magnetic testing apparatus and methods of magnetizing," United States Serial No. 410,334, filed September 10, 1941, now United States Letters Patent No. 2,352,371, and assigned to the same assignee as the present invention.

It is an object of the present invention to provide a novel switching system for magnetic testing apparatus and particularly magnetic testing apparatus which includes a magnetizing prod which is arranged to engage the object to be tested to cause current to flow through the latter.

It is a further object of the present invention to provide a novel switch means for magnetic testing apparatus and particularly for a magnetizing prod.

It is a still further object of the present invention to provide a novel handle switch in a magnetizing prod.

Another and further object of the present invention is to provide novel switching means for a magnetizing member.

Another and still further object of the present invention is to provide novel magnetic testing apparatus and means for energizing the same.

Still another and further object of the present invention is to provide magnetic testing apparatus having novel means for connecting and disconnecting a current carrying contact element with a source of power.

It is an object of this invention to provide magnetic testing apparatus having switching means therein for sending direct current having a controllable ripple component through the object to facilitate movement of the finely divided paramagnetic particles on the object into a defining pattern.

It is a further object of this invention to provide novel magnetic testing apparatus having switching means therein to initially magnetize the object by a surge of current of one intensity for a short period of time to produce a relatively high flux density in the object and to then subsequently reduce the magnetizing current to substantially lower intensity for the period of inspection, so that the object will not become unduly heated, and so that a relatively high flux density obtains in the object during the period of current flow at reduced intensity, as compared with what the flux density would have been had the object been initially magnetized by current not exceeding the reduced value of current.

It is a further object of this invention to provide novel contact prods for magnetic testing apparatus.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a diagrammatic showing of circuits and instrumentalities embodying the invention and with a terminal shown partly in section and partly in plan.

Figure 2 is a sectional view of a modified terminal portion with a part in plan.

Figure 3 is a sectional view of a modified terminal connection with a part in plan.

Figure 4 is a curve illustrating the relation between magnetizing force and flux in a specimen of material.

Figure 5 is a curve showing the output current of a three-phase full-wave rectifier under balanced phase voltage conditions.

Figure 6 is a curve showing the output current of a three-phase full-wave rectifier under unbalanced phase voltage conditions.

Figures 8, 9, 10, 11 and 12 are diagrammatic showings of modified arrangements of circuits and instrumentalities embodying the invention.

Figure 7:
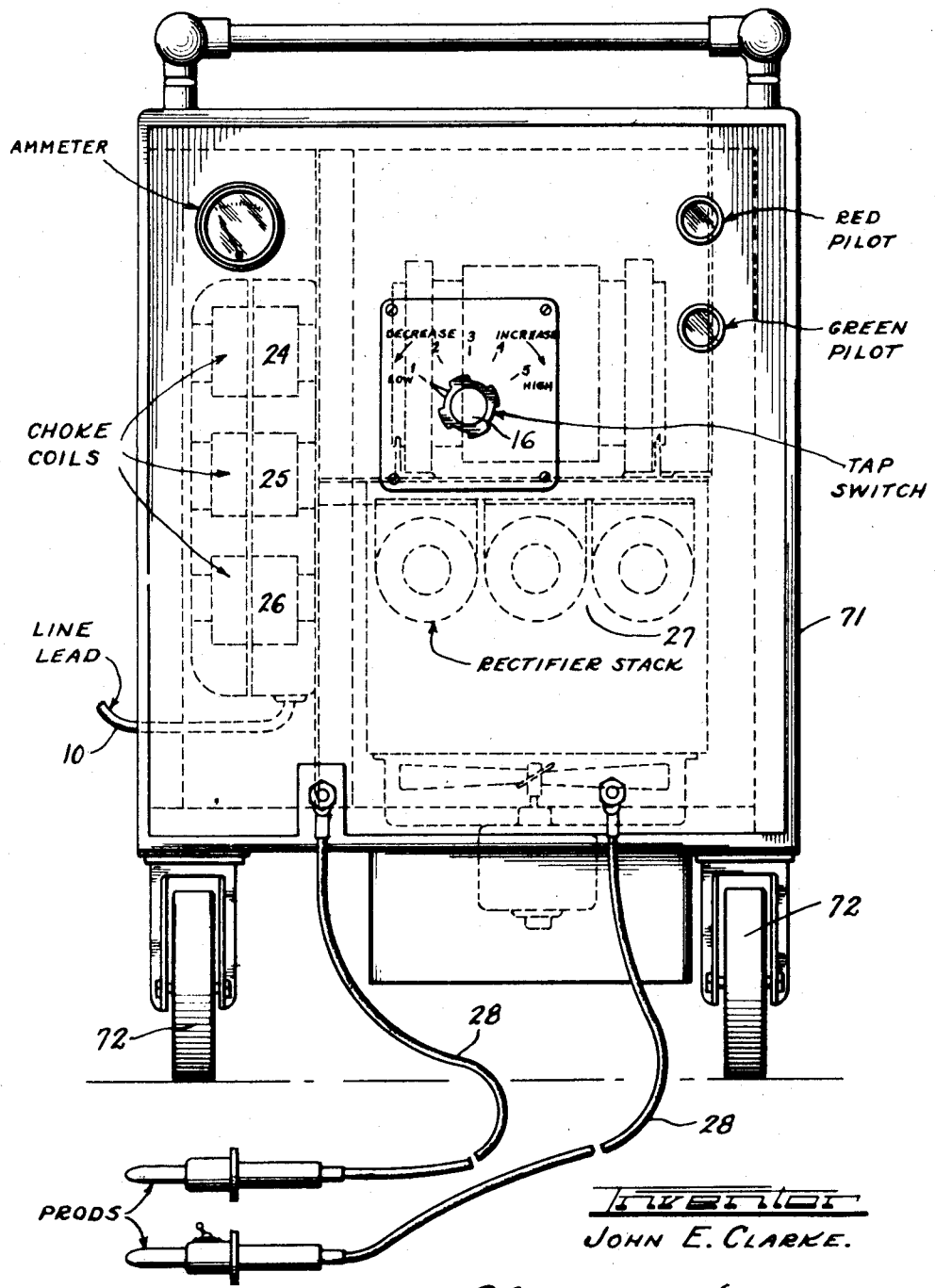
Figure 7 illustrates a portable power source with parts in plan and parts indicated by dotted lines.

One embodiment of the invention is shown diagrammatically in Figure 1, in which a source of alternating current comprising three-phase power lines 10 is connected through a circuit breaker 11 to two auto-transformers 12 and 13 provided with winding taps, indicated at 14 and 15, respectively, and with tap switches 16 and 17, for supplying power to a three-phase bank of transformers 18, 19 and 20, respectively. The primary windings of the transformers are connected by line leads 21, 22, and 23 through choke coils 24, 25 and 26 to the middle leg of the power supply and to the tap switches, so that there is a choke coil in each leg of the three-phase supply, and so that there are means for selectively varying the voltage impressed on the transformers in two of the phase leads. The secondary windings of the transformers are connected to a group of rectifiers, indicated generally at 27, in the manner shown, to provide a full-wave rectification. The rectifiers are of the copper-oxide type, or of any other conventional dry type.

Heavy current flexible leads 28 connect the output side of the rectifier bank with a contact prod, indicated generally at 29, for connection to a specimen, indicated generally at 30, for magnetization of the specimen by current therethrough.

The contact prod 29 may be formed of a steel shell 31 to which a handle 32 is secured. The inner face of the shell 31 is suitably covered with insulation as indicated at 33, and the shell is provided with an end cap 34 of insulating material. A reciprocable rod 35, of copper or the like, is housed in the shell 33, and is normally pressed outwardly by a spring 36. A lug 37 on the rod is connected to the lead 28.

Within the shell there is a pair of contact elements 38 to form an auxiliary switch 39, and one of the contacts is carried on the shell in insulated relation thereto, and the other is carried by the rod 35 in insulated relation thereto. When the contacting end 40 of the rod 35 is pushed against the specimen 30, inward movement of the rod will result in engagement of the contacts 38, and conversely, a force less than that necessary to overcome the outward push of the spring 36 will result in opening the switch 39.

The contacts 38 form an auxiliary switch 39 controlling the three-phase supply to the transformer bank so that the power supply will be interrupted before the contact 40 leaves the specimen, and so avoid arcing and burning of the specimen and of the contact point 40. The contacts 38 are connected in series with wires 41 and 42 and in series with a solenoid 43 to actuate the circuit breaker 11, and the circuit is fed by the secondary 44 of a small isolating transformer 45 which has its primary 46 connected to the power supply by wires 47 through a switch 48.

It will now be evident that any intentional or accidental decrease in substantial amount of the force with which the prod is applied to the specimen will result in the de-energizing of the solenoid 43 and the opening of the circuit breaker 11. Thus, the circuit is opened on the high-voltage low-current side, where it can be readily interrupted by a high-speed circuit breaker, and use of the contact point 40 as a circuit breaker is avoided.

The contact prod may also take the form shown in Figure 2, in which a normally open switch 49 is mounted on the contact prod 50 in insulated relation thereto, and is closed when an insulated hand grip sleeve 51 slidable on the prod is pushed against the button 52 of the switch. Additional spring means tending to move the sleeve to circuit-opening position may be provided, as indicated by a spring 53 disposed between the sleeve 51 and an abutment 54 on the rod.

When the magnetizing current is of low intensity, a modified form of contact prod may be employed, as shown in Figure 3. In this modified form, the prod 55 is housed in an insulating housing 56 within a steel protective housing 57 which has a handle 58 secured thereto. A cable 59 is carried through the handle to a stationary contact 60 in the insulating housing, and another contact 61 carried by the prod is adapted to engage it when the prod is pushed against the specimen in opposition to a spring 62 in the housing 56. The contacts 60 and 61 may be of silver, or other suitable material.

The choke coils 24, 25 and 26 are normally short-circuited by a circuit breaker indicated generally at 63. This circuit breaker 63 is arranged to be opened upon the energization of its operating solenoid 64, which is connected to the lines 41 and 42 through a timing switch 65 controlled by the auxiliary switch 39 of the prod. The timing switch is shown as provided with a dash-pot 66 having a control valve 67 for ease in illustrating a delayed action switch, but other conventional forms of relays or switches, such as the induction type of relay with time setting, may readily be employed to insert the choke coils in the circuit at a predetermined time following the closing of the auxiliary switch 39.

The power supply voltage to the transformers 18, 19 and 20 is adjusted so that when the choke coils are short-circuited and in effect out of the circuit, there will be an abnormal, although intended, surge of direct current from the rectifiers and through the specimen to be magnetized, and this current of relatively high intensity is maintained for a predetermined time until the choke coils are made effective to reduce the magnetizing current in the specimen to a lower and sustained value during the inspection of the magnetized specimen.

A sustained current of high density in the specimen would result in undue heating of the specimen and relatively high power loss, and a sustained current of high intensity in the leads causes troublesome magnetic leakage and interference with inspection of the magnetized specimen when paramagnetic particles, indicated at 68, are applied to the specimen to detect defects in the specimen.

When the current is sent through the specimen to magnetize it for inspection, the total field in the space occupied by the specimen under inspection is the result of the field due to the iron of the specimen and that due to the current flow through the specimen.

The field due to the specimen being inspected by the use of paramagnetic particles is, of course, the desired portion of the total field. We must have current in the conductors feeding this portion, but we can increase the sensitivity of the inspection method for discovering cracks and flaws in the inspected portion of the specimen if we can reduce the disturbing effect of the currents in the conductors, so that the field due to the specimen itself is the major factor in determining the pattern to be taken by the paramagnetic particles.

In the method of magnetizing the specimen according to the present invention, the specimen is initially subjected to a surge of current of abnormally high intensity for a brief period to subject the specimen to an abnormally high magnetizing force and produce an abnormally high value of flux, and subsequently the current is reduced to and maintained at a lower and normal value, but the flux in the specimen—because of the specimen having been subjected to the surge—is greater than that initially possible with an initial application of the reduced value of current. The inspection, therefore, can be carried out with a flux condition in the iron adequate for inspection purposes, and yet with a relatively low value of current in the conductors.

In further explanation of the method, Figure 4 is now referred to. In the hysteresis curve shown for the purpose of illustration, the curve OA indicated generally the relationship between B and H for hard steel magnetized by current through it, if we assume that the specimen had no initial magnetism. If we let the line OF represent the value of H, the magnetizing force due to the current, on the normal induction or virgin curve, the line OK represents the consequent value of B, the magnetic flux.

If we again start from zero flux, but increase the value of H to correspond to the line OG, the flux value now becomes OM. Having reached the magnetizing force of value OG, if we now decrease the current to again represent a magnetizing force value of OF, we find that the flux is now of a value represented by the ordinate OL, a value much higher than obtained from the normal current working along the virgin curve line.

When the contact prods are applied to the specimen to result in the closing of the auxiliary switch 39 and the closing of the switch 11 by the solenoid 43, the initial magnetizing current through the specimen is abnormal for a period long enough to enable the circuit to reach a substantially steady state condition, and not long enough to injure the specimen by overheating.

Residual magnetism is generally very low in the specimen as it comes from the lathe or forge to the inspection bench, and it is a simple matter for the inspector to adjust the power supply voltage to make certain of a current surge to overcome or augment the residual and give a satisfactory value of flux for inspection purposes when the current is reduced to normal at the end of the surge period.

When a three-phase source is used to supply a bank of full-wave rectifiers, the direct current output is fairly smooth, as indicated by the heavy current line 69 of Figure 5, where it is assumed that there is no smoothing effect due to inductance and the voltages from the transformer secondaries are sinusoidal and equal. A multiphase source of A. C. voltage is usually employed to obtain smooth D. C. output, and although a three-phase input has the advantage of a balanced loading of the phases, the prime reason for the three-phase input is the smooth D. C. output.

In the method of magnetizing the specimen according to the present invention, the three-phase input is employed for the several advantages inherent in providing a three-phase load, but means are employed to obtain a D. C. output having pronounced ripple of desired characteristics, for in doing so it has been found that paramagnetic particles on the specimen are "lively" and readily distribute themselves over the inspection zone to produce a satisfactory pattern for inspection purposes.

The specimen is subjected to a pulsating direct current, and in circuit analysis it is convenient to think of this current as made up of a constant direct current plus a superimposed alternating current of a determinable frequency and wave shape. In this way the effect of incremental permeability of the specimen due to the ripple component can be more readily determined.

In Figure 6 there is shown the approximate result of supplying the transformer bank with voltages of normal value, half of normal value and 86% of normal value, respectively, on the phases, so that the direct current ouput of the rectifiers to the leads 28 is approximately that indicated by the heavy line 70.

The unbalancing of the phase voltages is obtained by adjusting the positions of the tap switches 16 and 17 to produce any desired amount of ripple in the direct current output of the rectifiers.

The transformers may, of course, be designed to produce a desired ripple due to certain transformers of the bank having abnormal performance characteristics compared with others of the bank either in the magnetic loading of the iron or in the regulation under load characteristics. However, the tap switches and auto-transformer arrangement shown enables one to readily control the ripple for most satisfactory control of the inspection procedure, particularly so when it is remembered that the specimens vary widely in size, shape, and material in routine inspection in the factory.

The tap switches may be initially adjusted as to position and then coupled together for voltage control by a single operating handle.

As is indicated in Figure 7, the choke coils, rectifiers, switches, meters, and indicating lamps are all mounted as a unitary structure in a casing 71 mounted on casters 72 as a portable unit for moving about the factory.

The surge current may be as high as 6,000 amperes in the testing of certain types of specimens of large size, but surge current values of around 1200 amperes are commonly used in factory inspection work.

For certain situations a surge-producing arrangement shown diagrammatically in Figure 8 offers advantages.

In Figure 8, the specimen, indicated at 73, is shown as connected by the contact prods 74 and by wires 75 and 76 to a suitable source of direct current 77 through the secondary 78 of a transformer 79 and a magnetic switch 80 having an operating solenoid 81 and an armature 82.

It is intended that upon the closing of the direct current circuit a surge voltage will be set up in the secondary 78 of the proper sign to momentarily increase the direct current through the specimen.

To obtain this surge voltage superimposed on the voltage of the direct current source, a rectifier tube 83 is supplied with energy from a transformer 84 to charge a condenser 85 connected in series with the primary 86 of the transformer 79. The condenser 85 is fed by the tube 83 through a current-limiting resistor 87. One end of the primary 86 is connected to the cathode 88 of an electron tube 89. The grid 90 of the tube 89 is suitably connected to the tube 83 in a conventional manner for a high negative bias, so that the tube 89 is normally an open circuit across the ends of the circuit including the wires 91 and 92 and the winding 86 and the condenser 85. The operating coil 81 is connected to the alternating current supply leads 93 by wires 95 and an auxiliary switch 94, which may be on one of the prods in the manner already disclosed in the description of the prod 29 of Figure 1, and when the armature 82 moves to close the switch 80, it also closes a switch 96 which connects the wire 92 with a wire 97 to remove the bias on the grid 90. This permits an arc to pass from the anode 98 of the tube 89 to its cathode 88, and so closes the circuit of the wires 91 and 92 and permits the condenser 85 to discharge through the primary 86 as a surge of current. A resistor 99 may be connected in series with the condenser 85 to suppress oscillations and make the circuit aperiodic.

Duration and amplitude of the surge obviously depends upon the circuit constants and the voltage to which the condenser 85 has been allowed to charge at the moment of the closing of the switch 96 and the "firing" of the tube 89.

In a modification shown in Figure 9, a source of direct current indicated generally at 100 is connectible by the contact prods 101 to the specimen 102 through a circuit including a pair of wires 103 and 104, a magnetic circuit breaker 105, and a magnetic switch 106 which normally short-circuits a resistor 107.

When the prods 101 are pushed against the specimen and an auxiliary switch 108 is closed, the closing of the auxiliary switch results in the closing of a circuit including the source, the switch, wires 109 and 110, and an actuating solenoid 111 of the circuit breaker 105.

With the closing of the circuit breaker 105 there is an initial current of high intensity allowed to flow for a predetermined period of time until the switch 106 opens to insert the resistor 107 in the circuit and condition the circuit for a maintained current of relatively low intensity during the period of inspection. To effect opening of the switch 106, a magnet 112 is energized by current flow through the wire 104 to close a switch 113 connecting the source to the actuating solenoid 114 of the switch 106 through a delayed action relay 115 by wires 116 and 117.

As is best shown in Figure 10, a modification of the arrangement shown in Figure 8 may be employed, and in this modification a condenser 118 is charged by some source of suitable voltage, such as a direct current generator 119, through a resistor 120. The specimen to be magnetized, indicated at 121, is connectible to a direct current source, indicated at 122, through contact prods 123 and a secondary winding 124 of a transformer 125 by wires 126 and 127. The condenser 118 is in a circuit which comprises a primary winding 128 of the transformer, a relay 129, and connecting wires 130 and 131. A resistor 132 may be interposed in the circuit to make it substantially aperiodic.

It will now be evident that when the contact prods are initially connected to the specimen, current from the source will immediately energize the relay 129 to close its contacts and to result in the discharging of the condenser through the winding 128 to set up an impulse of voltage in the winding 124 to momentarily increase the current through the specimen. A choke coil 133 may be inserted in series with the generator to more effectively isolate the condenser from the generator at the moment of discharge. A switch 134 may be inserted in the condenser circuit to interrupt it when desired. The resistor 120 is designed for the conventional purpose of charging the condenser at a relatively slow rate, and the constants of the condenser circuit are designed so that there is a substantial increase of current for a sufficiently long period through the specimen while the condenser is discharging.

Under certain service conditions, and when the magnetizing current is relatively low, it may be advisable, for cost reasons, to dispense with some of the desirable control features shown in Figure 1, and to adopt the modification shown in Figure 11. In Figure 11, some suitable form of main switch 135 is interposed in the power lines 136, and the power lines feed rectifiers 137 through transformers 138 and through choke coils 139. The choke coils are normally short-circuited by a switch 140 which has an operating solenoid 141 and suitable time-delay means, indicated at 142 by a conventional dash pot arrangement. When contact prods 143, connected to the rectifiers by wires 144, are connected to the specimen 145, a relay 146 responsive to current in the wires 144 closes its switch 147 to energize the solenoid 141 through wires 148 and 149 connected to the power lines. A switch 150 may be interposed in the solenoid circuit to be opened at will.

The main switch 135 may be remotely controlled in the manner shown in Figure 1, or in any conventional manner, and a suitable alternating current relay responsive to current in the power lines 136 may be substituted for the direct current relay 146 in the direct current circuit. This substitution of the alternating current relay is shown in Figure 12, where a current-responsive, time-delay relay 151 is shown controlling the circuit of the solenoid 152 through the wires 153 and 154 connected to the power lines.

While I have shown particular embodiments of my invention, it will, of course, be understood that I do not wish to be limited thereto, since many modifications may be made, and I therefore, contemplate by the appended claims to cover all such modifications as fall within the true spirit and scope of my invention.

I claim as my invention:

1. In combination, a contact prod, an auxiliary switch on said prod, an abutment of conducting material engageable by said prod, a source of alternating current, rectifier means, a first circuit means connecting said rectifier means with said prod and said abutment of conducting material to pass current therethrough through said prod, a second circuit means connecting said rectifier means with said source for energization thereby, a main switch in circuit connection with said second circuit means, motor means connected to operate said main switch, a third circuit means connecting said auxiliary switch with said motor means for the energization of said motor means, an impedance, and timing means operably connected with said third circuit to automatically insert said impedance in said second circuit means.

2. In combination, an abutment member of conducting material, a source of direct current, a charged condenser, a contact prod, a transformer having one winding in a first circuit with said source and said prod and said abutment to pass current through said abutment member, said transformer having a second winding in a second circuit with said condenser, and switch means on said prod in circuit connection with said second circuit and operable to effect the discharging of said condenser through said second winding.

3. In combination, an abutment member of conducting material, a source of direct current, a charged condenser, a transformer having one winding in a first circuit with said source and said prod and connectible to said abutment member to pass current therethrough, said transformer having a second winding in a second circuit with said condenser, and switch means in said second circuit and responsive to current in said first circuit to effect the discharging of said condenser through said second winding.

4. In the magnetic testing of engineering materials including sending current through a specimen of the material, in combination, a specimen to be tested, a first source of direct current, circuit means connecting said first source with said specimen to pass current therethrough, a second source of direct current, means responsive to current in said circuit means, and means controlled by said last-named means for connecting said second source in aiding connection with said first source for a predetermined period of time thereby to increase the current flowing through said specimen for said predetermined period of time.

5. In the magnetic testing of engineering materials including sending current through a specimen of the material, in combination, a first source of direct current, a contact prod, a specimen of the material to be tested, circuit means connecting said first source and said prod with said specimen to pass current therethrough, said contact prod including a contact rod, switch means, and switch actuating means arranged for movement relative to said rod, a second source of direct current, and means in circuit with said switch means operable to connect said second source in aiding connection with said first source.

6. In the magnetic testing of engineering materials including sending current through a specimen of the material, in combination, a first source of direct current, a contact prod, a specimen of the material to be tested, circuit means connecting said first source and said prod with said specimen to pass current therethrough, a second source of direct current, and switch means on said prod connected with means operable to connect said second source in aiding connection with said first source.

7. In combination, a contact prod, an auxiliary switch on said contact prod, an abutment member of conducting material engageable by said prod, a source of direct current, circuit means including said source and said prod and said abutment member for passing current from said source through said abutment member, an impedance, timing means in circuit connection with said auxiliary switch, and means controlled by said timing means for inserting said impedance in said circuit means after a predetermined period of passing current through said abutment member without said impedance in said circuit.

JOHN E. CLARKE.

REFERENCES CITED

The following references are of record in the file of this patent:

UNITED STATES PATENTS

| Number | Name | Date |
|---|---|---|
| 2,240,812 | Sparrow | May 6, 1941 |
| 1,899,000 | Johnson | Feb. 28, 1933 |
| 2,119,220 | Scruggs | May 31, 1938 |
| 1,955,967 | Leathers | Apr. 24, 1934 |
| 2,155,413 | Eckman | Apr. 25, 1939 |
| 2,245,920 | Jardine et al. | June 17, 1941 |
| 2,221,576 | Dawson | Nov. 12, 1940 |
| 2,277,431 | Fitch | Mar. 24, 1942 |
| 2,217,733 | De Forest | Oct. 15, 1940 |
| 2,136,375 | De Forest | Nov. 15, 1938 |
| Re. 19,611 | De Forest | June 18, 1935 |
| 254,948 | Fox | Mar. 14, 1882 |
| 844,090 | Bijur | Feb. 12, 1907 |
| 861,155 | Achard | July 23, 1907 |